United States Patent [19]

Ma

[11] Patent Number: 4,934,211
[45] Date of Patent: Jun. 19, 1990

[54] CRANK MECHANISM

[75] Inventor: Thomas T. Ma, Chelmsford, United Kingdom

[73] Assignee: Ford Motor Company, Dearborn, Mich.

[21] Appl. No.: 244,975

[22] Filed: Sep. 15, 1988

Related U.S. Application Data

[63] Continuation-in-part of Ser. No. 89,053, Aug. 24, 1987, abandoned, which is a continuation of Ser. No. 802,486, Nov. 27, 1985, abandoned.

[30] Foreign Application Priority Data

Nov. 27, 1984 [GB] United Kingdom ............... 8429916

[51] Int. Cl.$^5$ .................................................... F16C 3/04
[52] U.S. Cl. ................................... 74/595; 123/192 B; 74/603
[58] Field of Search ............... 74/68, 590, 591, 567, 74/603, 41, 63, 604; 123/192 B

[56] References Cited

U.S. PATENT DOCUMENTS

| | | | |
|---|---|---|---|
| 2,082,761 | 6/1937 | Bloss et al. | 74/591 |
| 2,143,945 | 1/1939 | Humphrey | 74/591 |
| 2,150,822 | 3/1939 | Eaton | 74/591 |
| 2,618,172 | 11/1952 | Shoup | 74/591 |
| 3,112,657 | 12/1963 | Huck | 74/590 |
| 3,208,291 | 9/1965 | Ross | 74/41 |
| 3,230,782 | 1/1966 | Harryman et al. | 74/41 |
| 3,528,319 | 9/1970 | Ishida | 74/603 |
| 3,884,050 | 5/1975 | Borcuk | 74/68 |
| 4,031,776 | 6/1977 | Lenne | 74/567 |
| 4,052,898 | 10/1977 | Miller et al. | 74/590 X |
| 4,440,123 | 4/1984 | Tsai | 123/192 B |
| 4,480,607 | 11/1984 | Tsai et al. | 123/192 B |
| 4,489,683 | 12/1984 | Tsai et al. | 123/192 B |

FOREIGN PATENT DOCUMENTS

| | | | |
|---|---|---|---|
| 870385 | 3/1942 | France | 74/604 |
| 291632 | 6/1928 | United Kingdom | 74/591 |
| 1315993 | 5/1973 | United Kingdom | 74/567 |
| 2186939 | 8/1987 | United Kingdom | 74/63 |

Primary Examiner—Vinh T. Luong
Attorney, Agent, or Firm—Jerome R. Drouillard; Clifford L. Sadler

[57] ABSTRACT

An engine crankshaft has a crankpin that is radially slidably mounted relative to the crankshaft axis so that its axis can follow other than a circular path centered on the cranking axis. The mechanism includes at least one main bearing section with a stationary eccentric bearing surface, and at least one web fixed to the crankshaft and extending radially from the main bearing section. A housing is slidably mounted on guide surfaces on the webs for a sliding movement along the web, and has a crankpin secured thereto. The non-rotating eccentric bearing surfaces engaged by the housing force the housing to slide radially in and out along the web in synchronism with rotation of the crankshaft such that the distance of the center of the crankpin axis from the center of the main bearing section axis varies as a function of the angle of rotation of the crankshaft.

7 Claims, 3 Drawing Sheets

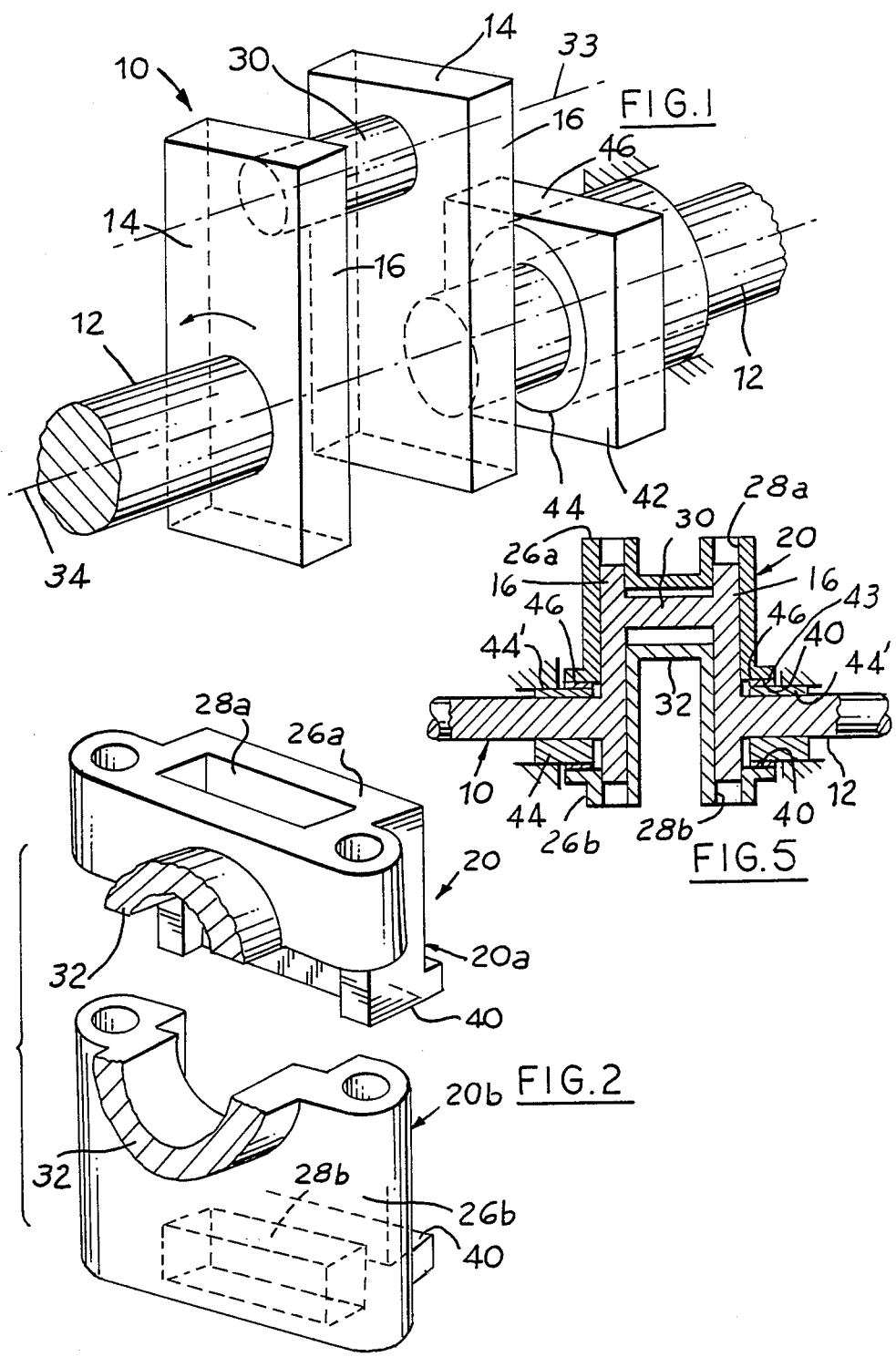

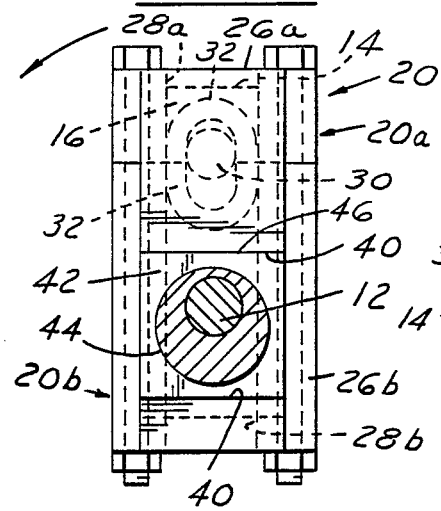
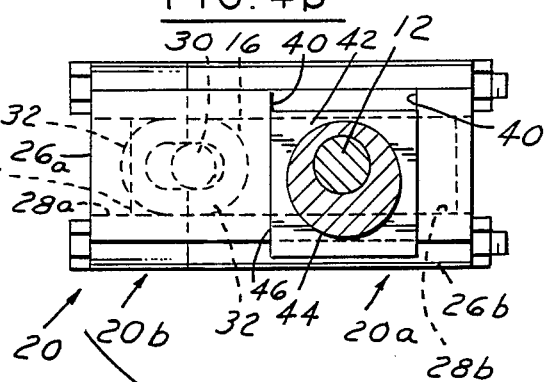
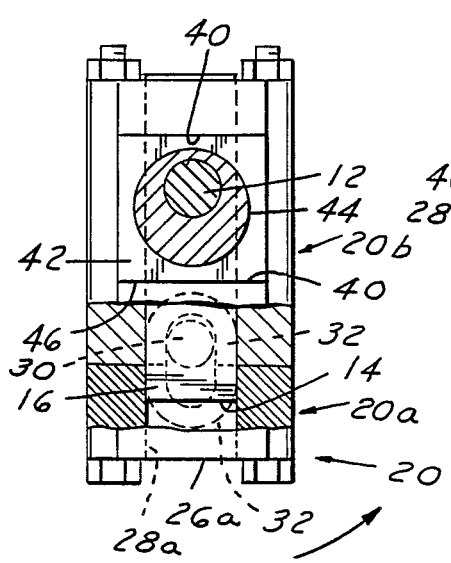
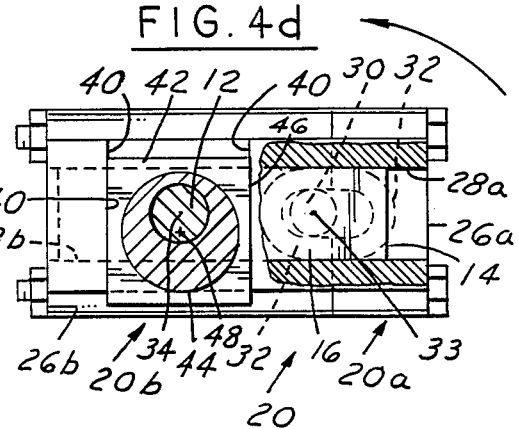

CRANK MECHANISM

This application is a Continuation-in-Part of U.S.S.N. 89,053, filed Aug. 24, 1987, abandoned, which is a continuation of U.S.S.N. 802,486, filed Nov. 27, 1985, abandoned.

The present invention relates to a crank mechanism.

BACKGROUND OF THE INVENTION

A crankshaft in an internal combustion engine comprises main bearings which define the axis of rotation, webs which extend radially from the main bearings, and crankpins connected to the webs and arranged to describe a circle as the crankshaft rotates. The connecting rods are mounted via the big end bearings on the crankpins and while their lower ends connected to the crankpins move in a circle, their other ends, connected to the pistons, reciprocate within the cylinders.

The circular path followed by the lower end of the connecting rods determines the relative amount of time spent by the pistons in the different parts of their cycles. It is, however, desirable for thermodynamic reasons to be able to alter the time spent by the pistons in different parts of the combustion cycle. For example, it is more efficient for the combustion to take place at constant volume, and accordingly it is desirable for the cranking mechanism to permit the piston to pause near the top dead center position.

The present invention seeks to introduce greater flexibility into the control of the movement of an element, such as a piston, which drives or is driven by a crank mechanism.

According to the present invention, there is provided a crank mechanism for enabling a crankpin to follow other than a circular path centered on the cranking axis, the drawings showing a mechanism simulating a crankshaft that defines at least one main bearing section and one web extending radially from the main bearing section, a housing 20 mounted for sliding movement along the web, a crankpin 32 secured to the housing, and slidable guiding means 40 operative to cause the housing to slide radially along the web in synchronism with the rotation of the simulated crankshaft, such that the distance of the center of the crankpin from the center of the main bearing section varies as a function of the cranking angle.

In a preferred embodiment shown in FIGS. 1, 2, 3, and 4a–4d, to be described, the housing is formed with a slideway 40 extending transversely to the webs and receiving a slide block 42 which is journalled for rotation about an axis parallel to but offset from or eccentrically mounted with respect to the axis of the main bearing section.

In another embodiment shown in FIG. 5, to be described, the slidable guiding means comprises a cylindrical guide surface 44' arranged eccentrically with respect to the main bearing section 12, and a pair of guide surfaces 40 on the housing extending transversely to the webs and operatively engaging the cylindrical guide surface 44'.

The degree of eccentricity of the cylindrical guide surface or the axis of the slide block journal, as the case may be, may be adjustable or fixed. If it is merely desired to alter the duration of the different parts of the combustion cycle, then a fixed eccentricity is sufficient, as shown. However, by permitting the eccentricity to be varied, as shown in FIG. 6, to be described, it is possible to construct an engine with variable compression ratio. This has application, for example, in a diesel engine in which cold starting problems can be mitigated by altering the compression ratio.

BRIEF DESCRIPTION OF THE DRAWINGS

The invention will now be described further, by way of example, with reference to the accompanying drawings, in which:

FIG. 1 is a schematic perspective view of a simulated crankshaft of a first embodiment of the invention;

FIG. 2 is an exploded partial perspective view of a housing that is slidable along the webs of the simulated crankshaft in FIG. 1 and including a crankpin;

FIG. 4a is a cross-sectional view taken on a plane indicated by and viewed in the direction of the arrows IVa—IVa of FIG. 3;

FIG. 4b–4d are views similar to FIG. 4a illustrating the parts rotated to different operative positions; and FIGS. 5 and 6 are sections showing alternative embodiments of the invention.

DESCRIPTION OF THE PREFERRED EMBODIMENTS

Figure 3:
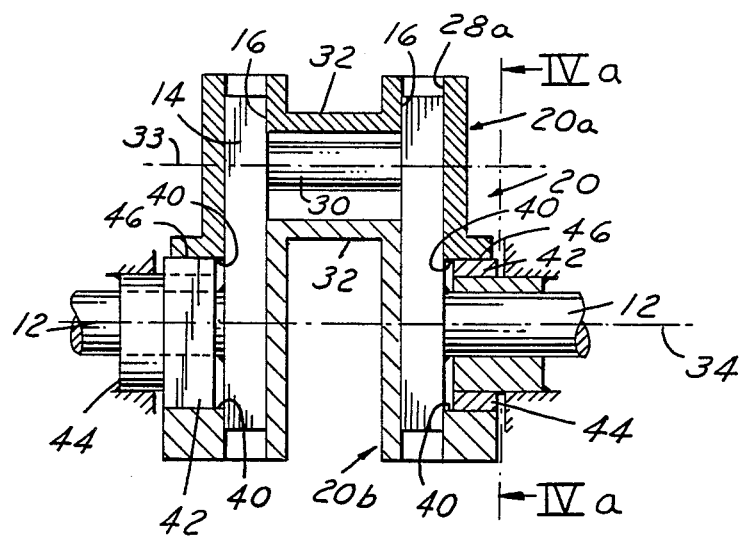
FIG. 3 is a longitudinal section partially broken away along a plane extending through main bearing sections 12 and link 30.

In FIGS. 1, 2, 3 and 4a–4d, there is shown a cranking mechanism which comprises a simulated crankshaft 10, i.e., it resembles a conventional crankshaft. The crankshaft 10 includes main bearing sections 12 which are journalled in the usual manner in pillar blocks (not shown). Webs 14 extend radially from and are fixed to the main bearing sections 12, but the webs in this case are formed with accurately parallel side surfaces 16 which act as guides for a housing 20 shown in FIGS. 2, 3 and 4a–4d.

The webs 14 are connected to each other by a connecting link 30 which is not itself a crankpin; that is to say, it is not directly connected to the big end (not shown) of the engine connecting rod.

The housing 20, as shown in FIGS. 2, 3 and 4a–4d, has essentially a hollow H-shape in cross-section. it is formed in two parts, upper part 20a and lower part 20b, each of which is symmetrically constructed about a central Plane, only one-half of each part being shown in FIG. 2. Each upper part 20a has two sleeves 26a, and each lower part 26b has two sleeves 26b. Each upper sleeve 26a is formed with a rectangular slot 28a that mates with a similar rectangular slot 28b formed in each lower sleeve 26b, the slots being of the same shape but of a slightly larger cross-section than the webs 14.

Each part of the housing 20 is formed with a horizontal half of, in this case, an oval shaped (see FIGS. 4a–4d) tubular crankpin 32. In the assembled cranking mechanism, the upper housing part 20a, as viewed in FIG. 3, is slipped over the upper ends of both of the webs 14 and likewise the lower part 20b is slipped onto both of the webs 14 from beneath. The two parts of the housing 20 then are bolted together by means not shown and are free to slide as one vertically on the webs 14, the degree of movement being limited by the relative radial clearance between the inner diameter of the oval shaped tubular crankpin 32 and the outer diameter of the link 30. The axis 33 of the crankpin 32, therefore, follows a generally circular path about the axis 34 of the crankshaft 10 as the simulated crankshaft rotates, but it is also capable of limited radial movement away from this circle depending on the radial position of the housing 20 relative to the webs 14.

In the embodiment of FIGS. 1-4, the upper and lower housing parts 28a and 28b when bolted together form a vertical clearance between the two on the backside defining a horizontal slideway 40 (FIGS. 2, 4a-4d) transverse to the axis of the webs 14. A slide block 42, again formed in separable halves (not shown), is journalled about an eccentric bearing surface 44 that is held stationary or against rotation, by means not shown, and within which is journalled the bearing shaft 12. The block 42 has parallel guide surfaces 46 which engage within the slideway 40.

As the simulated crankshaft 10 rotates, the block 42, which is captured in the slideway 40, moves horizontally as it rotates with the bearing section 12 about the axis 48 (FIG. 4d) of the stationary eccentric surface 44, the axis 48 in this case being in line with the axis 34 of the main bearing but below it. The engagement of the block 42 in the slideway 40, therefore, results in the housing 20 being forced to oscillate or move radially along the webs 14 as the simulated crankshaft turns in synchronism with the rotation of the main bearing section 12. The locus or path of the centerline 33 of the crankpin 32, therefore, is a modified circle, which is flattened near top dead center and extended near bottom dead center, as will become evident upon a consideration of FIGS. 4a-4d. Of course, a different locus can be obtained depending on the distance and angle between the axes of the crankshaft and the eccentric bearing surface. The preferred embodiment described in connection with FIGS. 1-4 is intended to improve the performance of a four-stroke internal combustion petrol engine, wherein ideally combustion should take place at constant volume.

FIGS. 4a-4d illustrate sequentially, in 90° segments, the forced radial movement of the housing 20 of the webs 14 as the slide block 42, which rotates with the simulated crankshaft 12, rolls on the stationary eccentric bearing surface 44.

The embodiment shown in section in FIG. 5 is generally similar to the FIGS. 1-4a-4b in the embodiment. The main difference is that the slide block 42 is omitted and the horizontal slideway 40 of webs 14 directly engages (a thin bearing surface 43 between) a stationary eccentric guide surface 44', on which the slideway 40 rolls as the simulated crankshaft rotates. The operation and construction is otherwise the same as described with reference to FIGS. 1-4.

From the viewpoint of the center 34 of the simulated crankshaft, the big end bearing (not shown) adapted to be attached to the crankpin 32 is seen to rotate with constant angular velocity but varying radius. However, the motion of the big end bearing approximates to a circle and viewed from the center 33 of that locus, the big end bearing would rotate with approximately constant radius but varying angular velocity.

This viewpoint assists in understanding the effects of the eccentric cranking on the combustion cycle, as the time spent by the piston in the different parts of the cycle are dependent upon the angular velocity as viewed from the apparent center of rotation.

Lean burning is desirable for several recognized reasons, among which are improved efficiency, economy and lower emissions. The difficulties in achieving lean burning are the problem with igniting the mixture and achieving complete combustion given the accompanying reduction in flame propagation speed. Thus, trying to run with lean mixtures leads to erratic firing and incomplete combustion.

The invention enables running with lean mixtures by altering several of the conditions prevailing during the cycle. In the first instance, enabling the piston to slow down near top dead center allows more time for the completion of combustion before the piston commences to descend, thereby permitting the burning of leaner mixtures. In designing a combustion chamber, emphasis is always placed on minimizing the distance to be traveled by the flame front to achieve complete burning, and the fact that the piston is descending during the burning process results in the flame front chasing the gases down the cylinder. This problem is mitigated in the present invention by maintaining the chamber compact long enough for the combustion to be nearly completed.

Because a longer period is allowed for the combustion phase to be commenced and completed within the compact volume, the engine is more tolerant to variations from one cycle to the other of the ignition of the charge and burn period duration. This again enhances the lean burn capability of the engine.

The velocity of the piston is furthermore increased during the induction stroke and compression stroke. The increase in velocity in the induction stroke improves turbulence in the induced charge which helps lean burn by increasing flame speed. The increase in velocity in the compression stroke reduces heat loss giving higher end of compression temperatures, again improving lean burn. Peak cylinder temperature, in this connection, is also increased by the combustion taking place at more constant volume.

Figure 6:
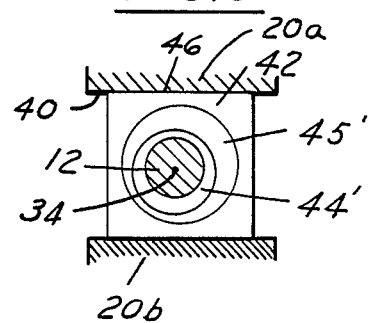

It will be appreciated that a locus of the centerline 33 of crankpin 32 other than that previously described can be achieved by suitable design of the means guiding the housing 20 to slide relative to the simulated crankshaft 10 during rotation. Furthermore, the degree of eccentricity may be made variable if the slide block 42 in FIG. 3, for example, is journalled on the outer surface of two stationary rings 44' and 45' (FIG. 6) of uneven wall thickness arranged as shown one inside the other around the main bearing section 12 to form a pair of eccentric surfaces. If the rings have equal eccentricity with respect to the axis 34 of webs 14, it is possible to change the overall eccentricity with respect to the slideway 40 by rotating the rings relative to each other to move the outer surface of the outer ring 45' from a position concentric with the main bearing sections 12 to a position where the eccentricity is equal to the sum of the variations in the wall thicknesses of the two rings. The two rings would then again be clamped or otherwise fixed against rotation so as to be operative to cause the desired oscillation of the housing 20 when the webs 14 rotate. Such alteration of the eccentricity not only affects the thermodynamics of the combustion process but can also affect the compression ratio of the engine, since it permits the volume at top dead center to be varied. This modification would also be equally applicable to the FIG. 5 embodiment by substituting two normally stationary but adjustable rings for the one eccentric surfaced ring 46.

The simulated crankshaft 10 as described above comprises pins or links 30 connecting the webs 14. However, the pins are not strictly essential given that the webs 14 are connected to one another by the housing 20. The presence of the pins or links 30 limits the extent of radial movement of the housing 20, but it has the advantage of maintaining the integrity of the entire shaft. The housings 20 must have some clearance to be capable of free movement on the simulated crankshaft 10 and in the absence of the pins 30, when summed over the length of the crankshaft, the clearances can result in the ends of the shaft being movable relative to each other, which is not advisable and is likely to cause chattering.

The invention has been particularly described by reference to the improvements which can be obtained in a four-stroke combustion engine. However, the eccentric cranking of the invention has applications in other contexts; for example, in a two-stroke engine it can permit the porting to be altered and can allow a greater period at bottom dead center to complete the scavenging.

While the invention has been shown and described in its preferred embodiments, it will be clear to those skilled in the arts to which it pertains, that many changes and modifications may be made thereto without departing from the scope of the invention.

I claim:

1. In combination, in an engine having a rotating crankshaft with main bearing sections and an axially spaced pair of web means fixed thereto for rotation therewith and extending radially therefrom, the improvement comprising, a non-rotating journal bearing surface eccentrically mounted with respect to the axis of the crankshaft and rotatably receiving the crankshaft therein, the web means having radially extending guide surfaces thereon, a housing mounted on the web means for a sliding radial movement with respect thereto, the housing having a crankpin type shaft offset radially from the crankshaft, and slidably guiding means on the housing engagable with and rollable on the eccentrically mounted bearing surface for a continuous radial oscillation of the housing and crankpin type shaft with respect to the crankshaft axis during continuous rotation of the crankshaft to continuously vary the radius of the crankpin from the axis of the crankshaft.

2. A crank mechanism as claimed in claim 1, wherein the slidable guiding means comprises a cylindrical guide surface arranged eccentrically with respect to the main bearing sections and a pair of guide surfaces on the housing extending transversely to the web means and engaging the cylindrical guide surface.

3. A combination as claimed in claim 1, wherein the housing is formed with a slide way extending transversely to the web means and receiving a slide block journalled for rotation about an axis parallel to and offset from the axis of the main bearing section.

4. A crank mechanism as claimed in claim 2, wherein the eccentricity of the cylindrical guide surface is adjustable.

5. A crank mechanism as claimed in claim 3, wherein the eccentricity of the center of rotation of the slide block is adjustable.

6. A combination as in claim 1, the housing having a pair of radially extending axially spaced portions each having a radially extending opening radially slidably receiving and retaining a web means guide surface thereon for a unitary rotation of the web means and housing and crankshaft, the crankpin type shaft connecting the axially spaced housing portions.

7. A combination as in claim 1, wherein the housing is essentially a hollow H-shape in cross-section and consists of upper and lower housing portions connected by a hollow crankpin, and link means interconnecting the housing portions within the crankpin, the link means having a diameter less than the diameter of the crankpin to provide a radial clearance space therebetween defining the radial limit of movement of the housing relative to the web means.

* * * * *